3,642,723
COPOLYMERS OF SUBSTITUTED ALKYL
ETHERS AND MALEIC ANHYDRIDE
Seizo Okamura, Kyoto, Koichiro Hayashi, Osaka, and
Yasuharu Nakayama, Kyoto, Japan, assignors to Ciba-
Geigy Corporation, Ardsley, N.Y.
No Drawing. Filed July 16, 1969, Ser. No. 842,368
Claims priority, application Japan, July 20, 1968,
43/51,347
Int. Cl. C08f 17/00
U.S. Cl. 260—78.4 R        10 Claims

ABSTRACT OF THE DISCLOSURE

Copolymers of substituted alkyl ethers and maleic anhydride prepared by the copolymerization of a ketal with maleic anhydride in the presence of a free radical initiator are useful as dispersion and emulsion stabilizers, textile finishing agents or leather treatment agents.

FIELD OF THE INVENTION

This invention relates to novel copolymers of substituted alkyl ethers and maleic anhydride and to the process of their preparation. These copolymers are useful as stabilizers for dispersions or emulsions as textile finishing agents and as leather treating agents.

SUMMARY OF THE INVENTION

The novel copolymers of substituted alkyl ethers and maleic anhydride are prepared by a process comprising copolymerizing a ketal and maleic anhydride in the presence of a free radical initiator, under an inert atmosphere. It is unexpected and surprising that said compounds can be copolymeized by this process since these compounds cannot be homopolymerized under the same conditions. An important advantage of the instant process over the conventional methods employed in preparing vinyl ether-maleic anhydride copolymers is the ability to conduct the polymerization at higher temperatures. Furthermore, the instant process is more economical.

DETAILED DESCRIPTION

The novel copolymers of this invention may be represented by repeating units of the following general formula:

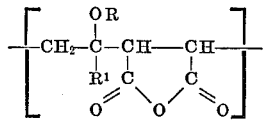

wherein

R is alkyl from 1 to 12 carbon atoms, and
R¹ is alkyl from 1 to 12 carbon atoms, aryl, alkaryl and aralkyl of up to 12 carbon atoms or cycloalkyl from 5 to 8 carbon atoms.

In the preferred embodiment R is alkyl from 1 to 8 carbon atoms, and R¹ is methyl. Most preferably, both R and R¹ are methyl groups. R¹ can also be a higher alkyl, aryl, alkaryl, aralkyl or cycloalkyl. Examples of the alkyl groups are methyl, ethyl, propyl, isopropyl, butyl, t-butyl-pentyl, hexyl, octyl, t-octyl, decyl, dodecyl and the like. Cycloalkyl groups can be cyclopentyl, cyclohexyl, cycloheptyl or cyclooctyl. Examples of aryl groups are phenyl, diphenyl and naphthyl; of alkaryl are tolyl, ethylphenyl, butylphenyl, dimethylphenyl and the like; and of aralkyl are benzyl, phenylethyl, phenylbutyl and the like.

The copolymers of this invention are prepared by polymerizing maleic anhydride with a ketal having the general formula:

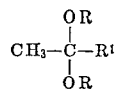

wherein R and R¹ are as defined above.

Illustrative examples of the ketals which can be employed in preparing the copolymers of this invention are acetone dimethyl ketal
acetone di-n-butyl ketal
acetone didodecyl ketal
acetone dioctyl ketal
2,2-diethoxypentane
2,2-dioctyloxytetradecane
1-phenyl-2,2-dimethoxypropane
1-cyclohexyl-2,2-dimethoxypropane
acetophenone dimethyl ketal
1-cyclohexyl-1,1-dimethoxyethane
p-methylacetophenone dimethyl ketal The maleic anhydride-substituted alkyl ether copolymers of this invention are useful as dispersing or suspending agents, textile finishing agents or leather treatment agents. As dispersing or suspending agents, the copolymers can be used in paints, waxes, polishes as well as in detergents, and cosmetic, toiletry or pharmaceutical preparations. When used as leather treatment agents, these copolymers act as body builders for the leather.

As noted above, the copolymers of this invention are prepared by copolymerizing the monomers in the presence of a radical initiator. The ratio of maleic anhydride to a ketal is 10:1 to 1:20, and preferably 5:1 to 1:15. Most preferably the ketal is used in excess of the anhydride, for example in a ratio of 1 mole of anhydride to 10 moles of a ketal. As radical initiators can be used catalysts such as α,α'-azo-bis-isobutyronitrile or organic peroxides.

The peroxides offer a variety of decomposition temperatures and organic residues. Suitable organic peroxides include alkylhydroperoxides, for example, tertiary butyl hydroperoxide, pinane hydroperoxide, cumene hydroperoxide, diisopropylbenzene hydroperoxide, p-methane hydroperoxide and para-tertiarybutylcumene hydroperoxide, ditertiarybutyl peroxide, peroxide derivatives of aldehydes and ketones such as hydroxyheptaldehyde, methylethyl ketone peroxide, methylisobutyl ketone peroxide and cyclohexanone peroxide. Peroxy esters such as tertiary butyl peracetate, tertiary butyl perbenzoate, ditertiary butyl diisopropyl peroxydicarbonate and tertiary butyl permaleic acid are also useful.

Based on the weight of the maleic anhydride monomer present, the amount of the radical initiator may be as low as 0.01% or as high as about 40%. Efficient polymerization is obtained by using from about 0.5 to about 8%. Further, the free radicals can be generated by treating the monomers of this invention with UV rays or ionizing radiation.

The copolymerization is carried out in an inert atmosphere such as nitrogen, helium, argon and the like. Nitrogen is preferred primarily for economical reasons. Although the process can be carried out with the addition of a solvent, it is generally preferable not to employ an additional solvent. Solvents are those in which maleic anhydride is soluble and which will not interfere with the copolymerization. These are for example aromatics such as ethylbenzene, xylene, p-cymene and cumene; ketones such as methyl amyl ketone, methylisobutyl ketone; acetates such as butyl acetate and amyl acetate; and ethers of ethylene glycol such as ethylene glycol monobutyl ether and ethylene glycol monoethyl ether and cyclic ethers such as dioxane. Effective boiling temperature is the temperature at which the solvent when in combination with other reactants of this process actually boils.

The temperature at which the copolymerization is generally carried out is between 0° and 120° C., and preferably between 30° and 80° C. Generally there is no time limit in which the copolymerization must be completed as it will vary depending on the specific ketals employed. Normally the temperature is maintained during the polymerization until the desired copolymer is obtained.

The preparation of the ketals used as the starting materials is described in Houben Weyl, Methoden der organischen Chemie, vol. 6/3, page 204 (1965). The invention is illustrated but not limited by the examples given below. Temperatures are expressed in degrees centigrade.

EXAMPLE 1

0.5 g. of maleic anhydride and 20 mg. of $\alpha,\alpha'$-azo-bis-isobutyronitrile were added to 5 ml. of acetone dimethyl ketal. The mixture was reacted for 20 hours at 60° to obtain 0.5 g. of copolymer. Elemental analysis showed C, 55.7%; and H, 5.4%. The calculated elemental analysis is C, 56.4%; and H, 5.85% based on the repeating structural unit of the first formula appearing above wherein R is methyl and $R^1$ is methyl. A molar ratio between acetone dimethyl ketal and maleic acid anhydride of 1:1 was found. The viscosity of the resulting copolymer was 0.09 in tetrahydrofuran at 50°.

If, instead of 5 ml. of acetone dimethyl ketal, 5 ml. acetone dibutyl ketal, 5 ml. acetone dioctyl ketal or 5 ml. acetone didodecyl ketal are used and otherwise is proceeded in the same way, the 1:1 copolymers of maleic anhydride and the mentioned ketals are obtained.

EXAMPLE 2

1 ml. of acetone dimethyl ketal, 0.5 g. of maleic anhydride and 100 mg. of $\alpha,\alpha'$-azo-bis-isobutyronitrile were dissolved in benzene to prepare a total of 5 ml. of benzene solution. The solution was reacted for 20 hours at 60° to obtain 0.45 g. of copolymer. Elemental analysis gave the following result: C, 53.4%; and H, 5.4%. A molar ratio of acetone dimethyl ketal to maleic anhydride was 1:1. The viscosity of the resulting copolymer was 0.06 in tetrahydrofuran at 30°.

If, instead of 5 ml. of acetone dimethyl ketal, 5 ml. butylmethyl ketone dimethyl ketal, benzylmethyl ketone dimethyl ketal, heptylmethyl ketone dimethyl ketal or 5 ml. dodecylmethyl ketone dimethyl ketal are used and otherwise is proceeded in the same way as described, 1:1 copolymers of maleic anhydride and the mentioned ketals are obtained.

EXAMPLE 3

1 ml. of acetone dimethyl ketal, 0.5 g. of maleic anhydride and 100 mg. of $\alpha,\alpha'$-azo-bis-isobutyronitrile were dissolved in dioxane to prepare 5 ml. of dioxane solution. The solution was reacted for 20 hours at 60° to obtain 0.52 g. of copolymer. Elemental analysis gave the following result: C, 57.2%; and H, 5.77%. A molar ratio of acetone dimethyl ketal to maleic anhydride was 1:1. The viscosity of the resulting copolymer was 0.06 in tetrahydrofuran at 30°.

If, instead of 5 ml. of acetone dimethyl ketal, 5 ml. acetophenone dimethyl acetal or 5 ml. cyclohexylmethyl ketone dimethyl ketal are used and otherwise is proceeded in the same way as described, 1:1 copolymers of maleic anhydride and the mentioned ketals are obtained.

EXAMPLE 4

0.5 g. of maleic anhydride and 100 mg. of benzoyl peroxide were added to 5 ml. of acetone dimethyl ketal and the reaction mixture was heated for 20 hours at 60° and 0.65 g. of copolymer were obtained. Elemental analysis: C, 56.8%; and H, 5.9%. A molar ratio of 1:1 was found between acetone dimethyl ketal and maleic acid anhydride. The viscosity of the copolymer in tetrahydrofuran was 0.08 at 30°.

EXAMPLE 5

| | G. |
|---|---|
| Maleic anhydride | 2.5 |
| Acetone dimethyl ketal | 16.0 |
| and | |
| $\alpha,\alpha$-Azo-bis-isobutyronitrile | 0.2 | were placed in a glass tube and dissolved to a clear solution. The glass tube was flushed with nitrogen, sealed and heated for 24 hours at 60°. The polymer formed was separated by suction, washed with acetone dimethyl ketal and dried. 2.56 g. copolymer was obtained as a white powder. The intrinsic viscosity of the copolymer at 30° in tetrahydrofuran was 0.08.

EXAMPLE 6

The following materials were reacted according to Example 5:

| | G. |
|---|---|
| Maleic anhydride | 2.5 |
| Acetone dimethyl ketal | 46.7 |
| and | |
| $\alpha,\alpha'$-Azo-bis-isobutyronitrile | 0.2 |

There was obtained 3.54 g. of a white powdery copolymer which had the intrinsic viscosity of 0.1 at 30° in tetrahydrofuran.

EXAMPLE 7

The following compounds were reacted according to Example 5, except that the reaction time was 10 hours at 80°:

| | G. |
|---|---|
| Maleic anhydride | 2.5 |
| Acetone dimethyl ketal | 39.7 |
| and | |
| $\alpha,\alpha'$-Azo-bis-isobutyronitrile | 0.125 |

The resulting copolymer (4.025 g.) was a white powder which had the intrinsic viscosity of 0.11 at 30° in tetrahydrofuran.

EXAMPLE 8

The following compounds were reacted according to Example 5, except that the reaction temperature was 40°:

| | G. |
|---|---|
| Maleic anhydride | 2.5 |
| Acetone dimethyl ketal | 39.7 |
| and | |
| $\alpha,\alpha'$-Azo-bis-isobutyronitrile | 0.2 |

The product was a white powdery copolymer (0.495 g.) which had the intrinsic viscosity of 0.12 at 30° in tetrahydrofuran.

EXAMPLE 9

The following materials were reacted according to Example 5:

| | G. |
|---|---|
| Maleic anhydride | 2.5 |
| Acetone dimethyl ketal | 39.7 |
| and | |
| Benzoyl peroxide | 0.05 |

The product, a white powdery copolymer (1.63 g.) had the intrinsic viscosity of 0.12 at 30° in tetrahydrofuran.

EXAMPLE 10

1 g. of maleic anhydride were added to 10 ml. of acetone dimethyl ketal. The mixture was irradiated 24 hours at 50° with gamma rays of an intensity of $1.5 \times 10^4$ roentgen per hour to obtain 0.19 g. of copolymer. The intrinsic viscosity of the resulting copolymer in tetrahydrofuran was 0.14 at 24°.

What is claimed is:

1. A copolymer having repeating units of the general formula

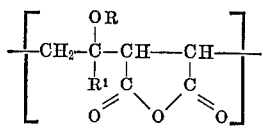

wherein
R is alkyl from 1 to 12 carbon atoms, and
$R^1$ is alkyl from 1 to 12 carbon atoms, aryl, alkaryl and aralkyl of up to 12 carbon atoms or cycloalkyl from 5 to 8 carbon atoms.

2. A copolymer of claim 1 wherein $R^1$ is alkyl group.
3. A copolymer of claim 1 wherein R is an alkyl group from 1 to 8 and $R^1$ is methyl group.
4. A copolymer of claim 1 wherein R and $R^1$ are methyl groups.
5. A process for the preparation of a copolymer of claim 1, said process comprising copolymerizing maleic anhydride and a ketal having the formula:

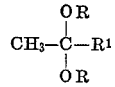

wherein R, and $R^1$ are as defined in claim 1, in the presence of a free-radical initiator or a generator at a temperature of between 0° and 120° C.

6. A process of claim 5, said process being carried out in a solvent.
7. A process of claim 5, wherein said initiator is $\alpha,\alpha'$-azo-bis-isobutyronitrile.
8. A process of claim 5 wherein R and $R^1$ are alkyl groups.
9. A process of claim 5 wherein R is an alkyl group from 1 to 8 carbon atoms and $R^1$ is methyl group.
10. A process of claim 5 wherein R and $R^1$ are methyl groups, said process being carried out in the presence of $\alpha,\alpha'$-azo-bis-isobutyronitrile and dioxane at a temperature of between 30° and 80° C.

References Cited
UNITED STATES PATENTS

| | | | |
|---|---|---|---|
| 3,436,378 | 4/1969 | Azorlosa et al. | 260—78.5 |
| 2,895,866 | 7/1959 | Amon et al. | 154—139 |
| 3,200,099 | 8/1965 | Lewis et al. | 260—80.76 |
| 3,468,857 | 9/1969 | Graver | 260—80.3 |

JOSEPH L. SCHOFER, Primary Examiner

J. KIGHT III, Assistant Examiner

U.S. Cl. X.R.

8—94.1 R, 115.5; 260—78.5 R